United States Patent [19]

Eby, Jr. et al.

[11] Patent Number: 4,467,354
[45] Date of Patent: Aug. 21, 1984

[54] VIDEO FORMAT UNIT

[75] Inventors: John C. Eby, Jr., Monroe, La.; David L. Cauthron, Hurst, Tex.; Michael M. Ludeman, Irving, Tex.; James R. Hicks, Austin, Tex.

[73] Assignee: Recognition Equipment Incorporated, Irving, Tex.

[21] Appl. No.: 320,406

[22] Filed: Nov. 12, 1981

[51] Int. Cl.$^3$ .............................................. H04N 1/40
[52] U.S. Cl. ..................................... 358/133; 358/166; 358/167; 358/284
[58] Field of Search ............... 358/166, 284, 261, 133, 358/167, 185; 364/515, 518; 382/54, 55, 56, 57

[56] References Cited

U.S. PATENT DOCUMENTS

| 4,128,850 | 12/1978 | Fischer | 358/284 |
| 4,196,454 | 4/1980 | Warren | 358/284 |
| 4,236,082 | 11/1980 | Butler | 382/54 |
| 4,298,895 | 11/1981 | Arai et al. | 358/284 |
| 4,345,314 | 8/1982 | Melamud et al. | 358/284 |

Primary Examiner—John C. Martin
Assistant Examiner—Edward L. Coles
Attorney, Agent, or Firm—Richards, Harris & Medlock

[57] ABSTRACT

In high speed imaging systems wherein document images are lifted and stored, it is desirable to reduce the amount of information to be stored. A video format unit utilizing video information from a data lift enhances the video information and then compresses the enhanced video data by coding the data in a repetitive run length type code. The coded data is then stored in an on-line system to permit the immediate recall of stored images.

17 Claims, 11 Drawing Figures

| 7 | | | | | 0 |
|---|---|---|---|---|---|
| LIFT CONTROL BLOCK ||||||
| BYTE COUNT ||||||
| NOT ASSIGNED | 5 | 3 N/A | | DOCUMENT ID | 0 |
| NOT ASSIGNED | 5 | 4 LIFT | 2 | FORMAT PARAMETER | 0 |
| MSB | | PSN ||| |
| | | PSN ||| LSB |
| BLOCK COUNT ||||||

BYTE COUNT
- COUNT OF TOTAL BYTES INCLUDING COMMAND AND BLOCK COUNT.

DOCUMENT ID
- MODULO 32 DOCUMENT IDENTIFIER.

FORMAT PARAMETER
- SELECTION OF FORMAT PARAMETER FOR THE DOCUMENT.

LIFT
- LIFT/NO LIFT CONTROL; LIFT IF SET.

PSN
- PRINT SEQUENCE NUMBER ASSIGNED TO THIS DOCUMENT.

BLOCK COUNT
- INCREMENTING BLOCK NUMBER (MODULO 256).

| | |
|---|---|
| IMAGE STATUS COMMAND | |
| BYTE COUNT | |
| MSB  PSN | # OF BYTES IN BLOCK |
| PSN  LSB | IMAGE PRINT SEQUENCE NUMBER |
| STATUS* | STATUS OF CAPTURED IMAGE |
| SEGMENTS TRUNCATED | # OF SEGMENTS TRUNCATED |
| HEIGHT | IMAGE HEIGHT IN 64 MIL INC. |
| WIDTH | IMAGE WIDTH IN 40 MIL INC. |
| BLOCK COUNT | INCREMENTING BLOCK # (MODULO 256) |

*STATUS - 0 GOOD
1 TRUNCATED AT 32K
2 SPECIFIED COMPRESSION AREA OUTSIDE IMAGE AREA

Figure 7

| | |
|---|---|
| EXCEPTION REPORT COMMAND CODE | |
| BYTE COUNT | BYTE COUNT = 6 |
| INTERNAL DOCUMENT ID | MODULO 32 DOCUMENT ID MAINTAINED BY VFU |
| LIFT BLOCK DOCUMENT ID | MODULO 32 DOCUMENT ID FROM LIFT CONTROL BLOCK |
| ERROR* | ERROR STATUS |
| BLOCK COUNT | INCREMENT BLOCK COUNT (MODULO 256) |

*ERROR - 0 NO ERROR
1 INCORRECT DOCUMENT ID NUMBER
2 NO FORMAT TABLE AVAILABLE
3 NO LIFT CONTROL BLOCK AVAILABLE
4 IMAGE BUFFER NOT AVAILABLE

VIDEO FORMAT UNIT

FIELD OF INVENTION

This invention relates to image systems and more particularly to a video format unit for use in an image system.

BACKGROUND OF THE INVENTION

Most prior document processing systems optically read information from documents, which information may be stored if not used immediately for processing. Some systems may lift portions of the document in order to retain certain fields of information on the document, and the document may also be filmed with a microfilm camera at high speed to retain a copy of the entire document. To optically read and digitally store an image of the document generally requires a very large storage capacity and has not been practice for high speed document processors.

In facsimile systems, document information is transmitted to produce a copy thereof at a remote location. In this instance, it is not necessary for long time storage of the document as the document is reproduced as the information representative thereof is transmitted. In order to reduce the time to send such documents, various coding methods have been performed on the information. Such codes, sometimes referred to as run length coding, is used to compress the information; however when it is desirable to run documents and capture image at rates up to 2,000 documents per minute, it is necessary to temporarily store the information and rapidly code it prior to storage on disk. Prior systems have not had the capability of processing and storing images at such high speeds.

SUMMARY OF INVENTION

The present invention is a video format unit which provides means for formatting images captured up to the rate of 2,000 documents per minute into blocks of data. The images are stored in an image buffer and scanned in a horizontal raster fashion. The black and white signals received as the document is scanned are enhanced utilizing correlation techniques. The resulting enhanced video information is stored in an image buffer in which the complete image of black/white video is stored to allow the image to be raster scanned in an horizontal direction for compression and encoded prior to the storage of the image onto various storage means such as disks. The video format unit may be used as a part of a larger image system such as that disclosed and claimed in copending U.S. patent application No. 320,352, filed Nov. 12, 1981.

THE DRAWINGS

The invention and the technical advance represented thereby will best be understood from the following detailed description when taken along with the following drawings and the appended claims.

DETAILED DESCRIPTION OF THE PREFERRED EMBODIMENT

The Video Format Unit (VFU) provides the means of formatting images captured at up to 2000 documents per minute into blocks of data. The VFU accepts p bit gray data (where p is typically in the range of 2 to 8 bits) representing an image of up to $W \times L$ pels. The image is enhanced by a digital filter and thresholded to create a single bit (black/white) image. This image is stored in an image buffer and scanned in a horizontal or vertical raster scan fashion. The horizontal or vertical scans of black/white data are coded using a repetitive run length coding technique. The coded data is packed into sixteen bit words and transmitted over the video bus to the Image Capture Disk Controller (ICDC).

The VFU inputs are: gray video input from the image lift electronics, enable document presence window from the transport electronics, reset document identification number counter from the transport electronics, increment document identification number counter from the transport electronics, and control information from the image CPU (ICPU).

Figure 1:
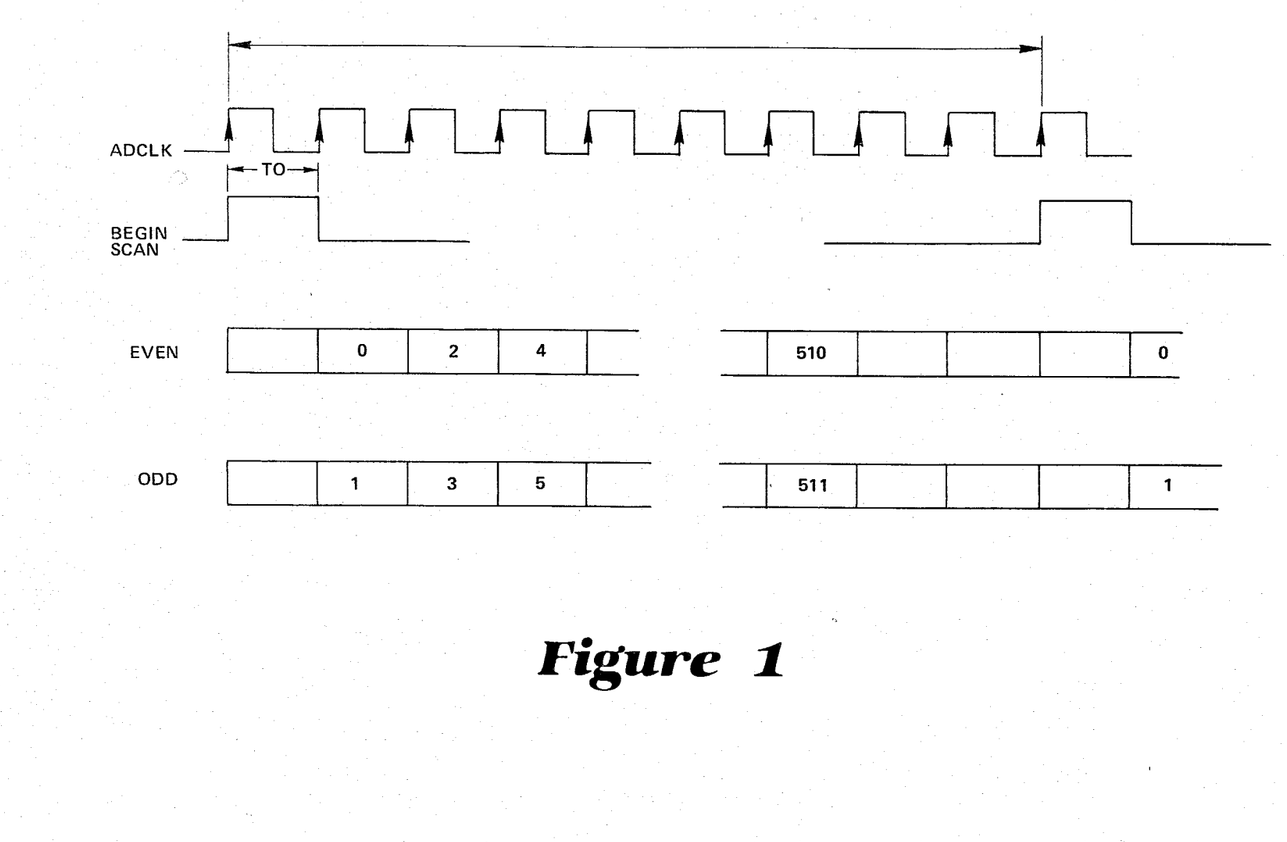
FIG. 1 is a timing diagram of the input functions of the video input unit.

The VFU accepts two k bit words representing odd and even array cells simultaneously. The array is of length W cells and scanned from the top of the document down. In a particular implementation using a 512 cell array and four bit gray data, the VFU accepts 256 8-bit words. The video is stored via a data clock and a begin scan. A timing diagram of the video format unit is shown in FIG. 1.

The video format unit generates a document presence signal from the video only when enabled by the enable document presence window signal. After detection of a document presence leading edge, the VFU processes the video until its internal document presence locater detects the trailing edge of the document, regardless of the enable document presence window signal. This trailing edge detection signal is generated by the document tracking logic in the transport electronics.

The enable document presence window signal becomes true approximately 1 MS prior to the documents leading edge arriving at the image lift station. It remains true for at least 2.5 MS after the document leading edge is at the image lift station.

Figure 2:
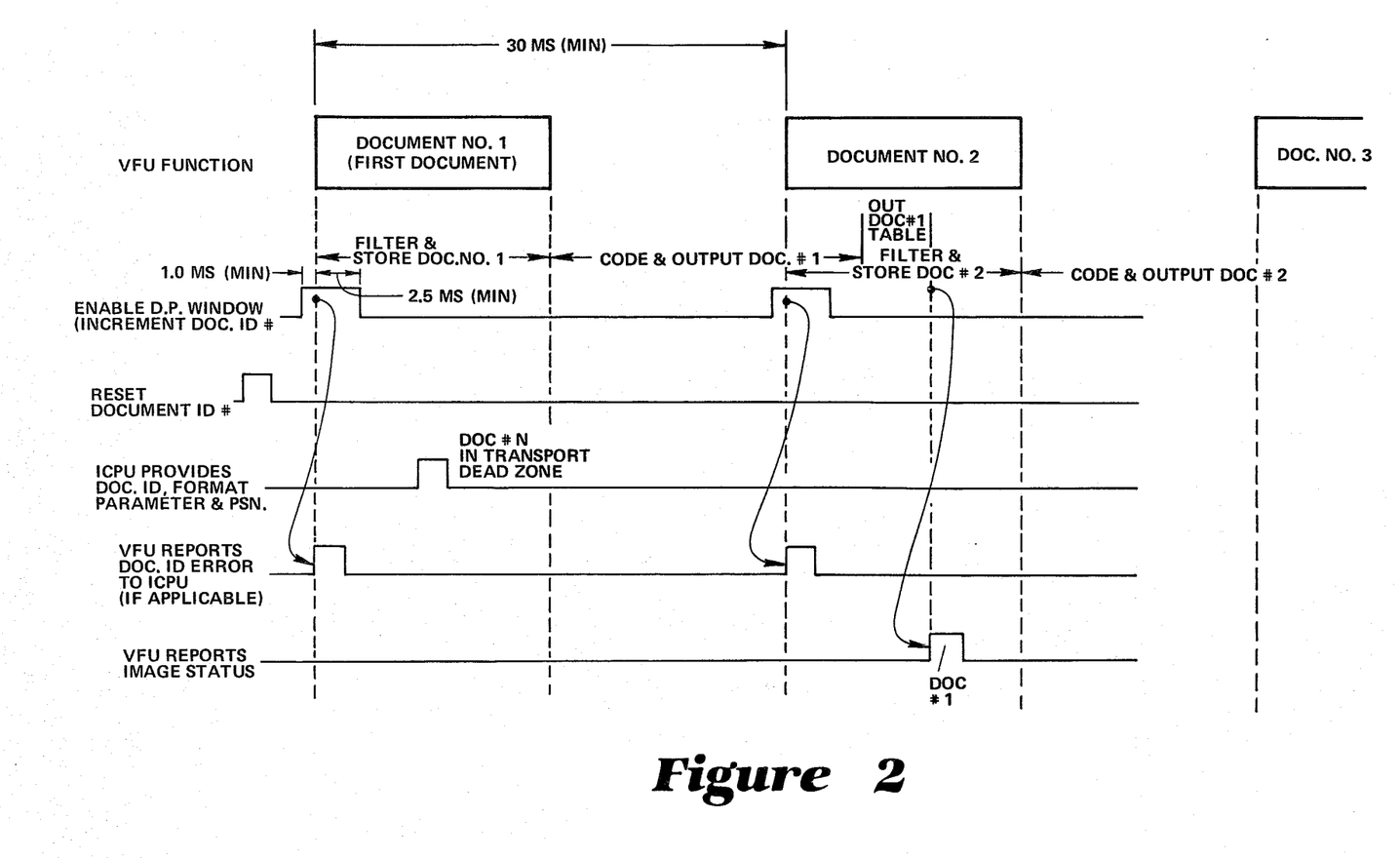
FIG. 2 is a timing diagram of the overall video system.

These two signals, enable document presence and trailing edge detection, are generated by the document tracking logic in the transport electronics. The VFU uses these signals to maintain a five bit document ID number that is to be verified with the ID number from the ICPU. The document ID number is reset to zero at initialization and incremented preceeding each document. Hence, the first documents ID number is 1 and afterwards the numbers are modulo 32. Timing is illustrated in FIG. 2.

The VFU receives the following control blocks: Initialization parameters and document parameters.

Figure 3:
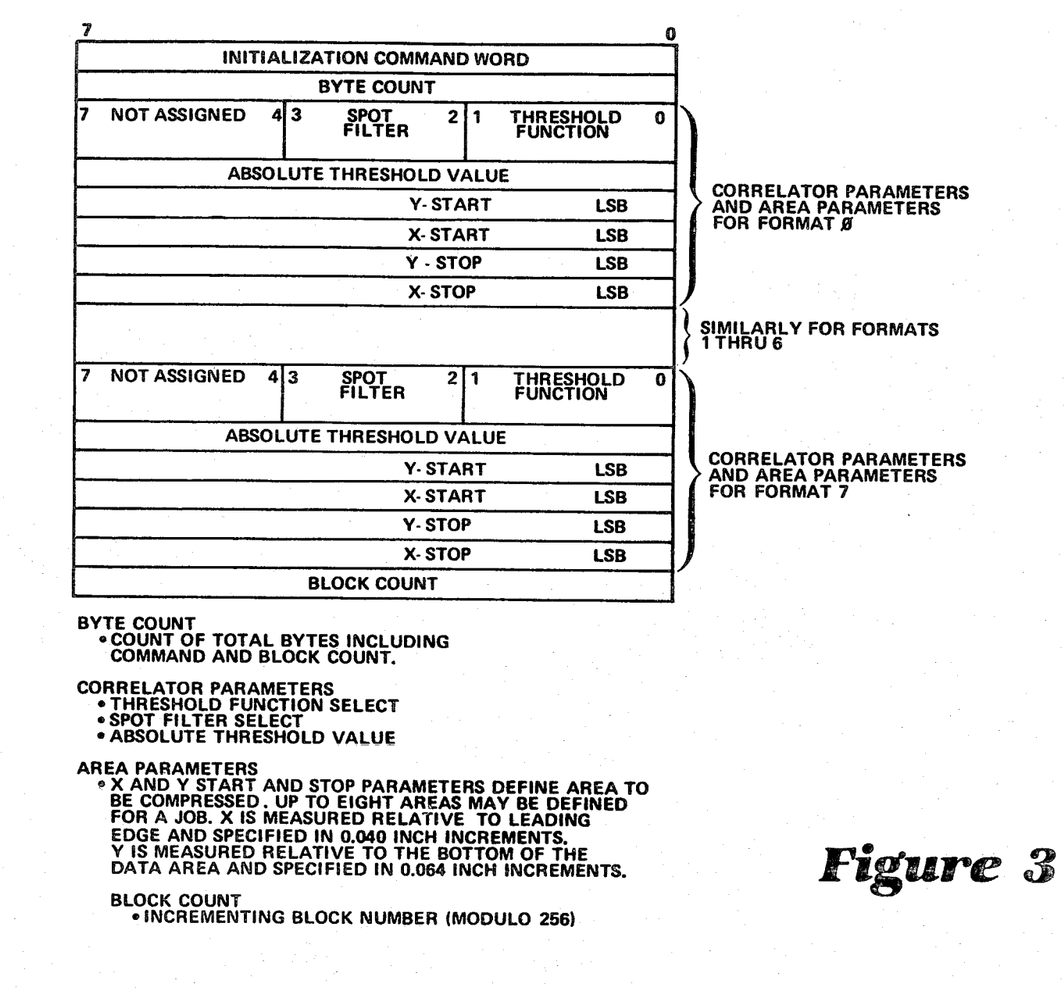
FIG. 3 illustrates the initialization parameter of the video format unit.
Figure 4:
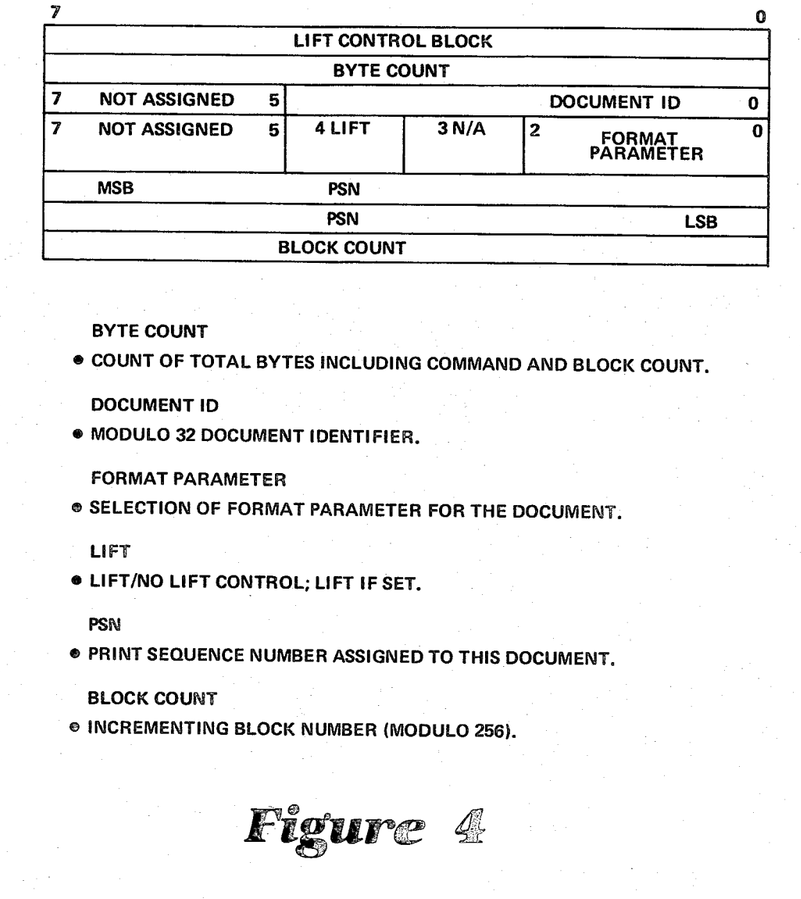
FIG. 4 illustrates the video format unit lift control function.

At initialization the VFU receives multiple sets of parameters from the ICPU. These are stored to allow a code to be transmitted in real time operation to select the parameter set. The control blocks received for a particular implementation of eight parameter sets are as shown in FIG. 3 and FIG. 4.

The VFU outputs formatted video and its associated table via the video bus. It also outputs control information, status and exceptions via the control bus.

Figure 5:
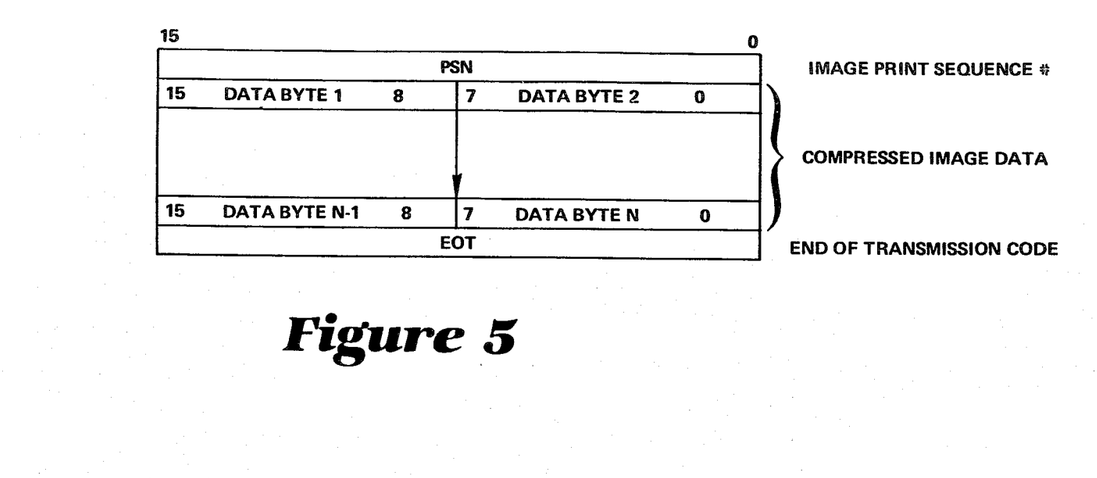
FIGS. 5 and 6 illustrates the format of the video.
Figure 6:
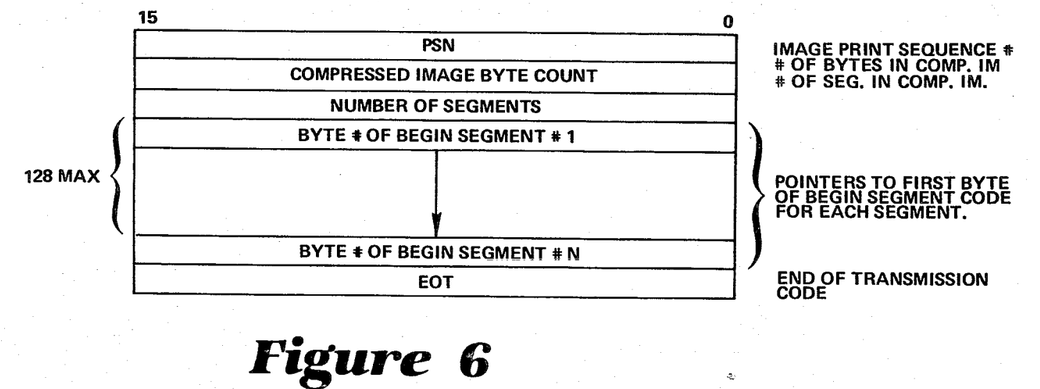
Figure 7:
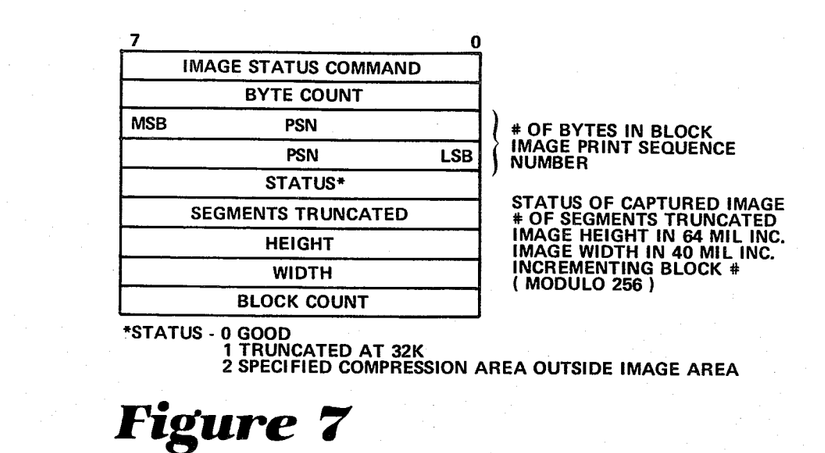
FIGS. 7 and 8 illustrate the image status in the system.
Figure 8:
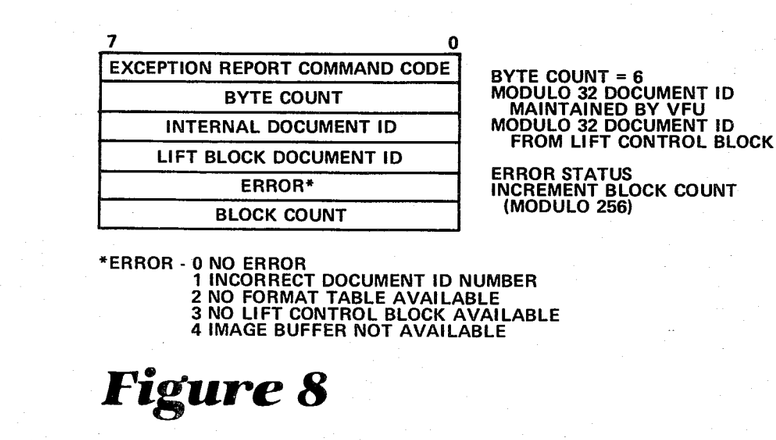

The format of the video is shown in FIG. 5; the table in FIG. 6; the image status in FIG. 7 and the exception report in FIG. 8.

Figure 9:
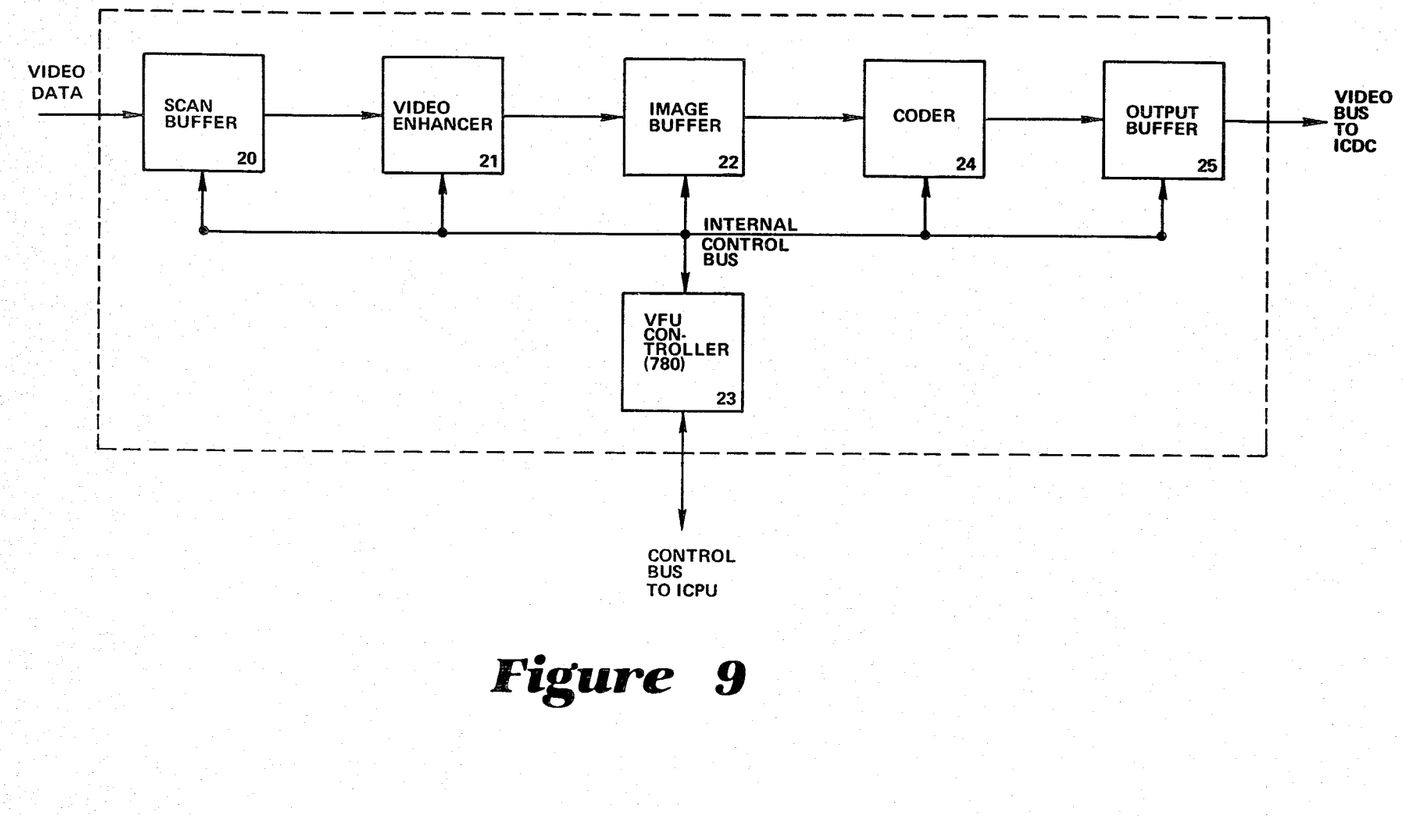
FIG. 9 is a simplified block diagram of the video format unit.

FIG. 9 is a functional block diagram for the VFU. The scan buffer (20) receives the video data from the video electronics and outputs the video synchronously in a format compatible with the video enhancer and image buffer.

The video enhancer (21) is a digital filter, thresholder and spot filter. It accepts the p bit video from the scan buffer and performs a correlation with a N×M matrix (where N and M are typically odd values between 1 and 31, and may be equal). "N" identifies the number of rows in the correlation matrix. "M" identifies the number of columns. The weights of each cell in the N×M matrix are stored in read only memory and may be altered individually. The resulting video is thresholded either by a fixed level or dynamically as a function of the sum of cells in the NxM matrix. The thresholded video is then passed by a 3×3 array to make the final black/white decision for each cell. This 3×3 spot filter is also stored in the read only memory for ease of alteration and multiple spot filter selections are provided in each VFU.

The image buffers (22) store a complete image of black/white video to allow the image to be raster scanned in a horizontal or vertical direction for compression.

Figure 10:
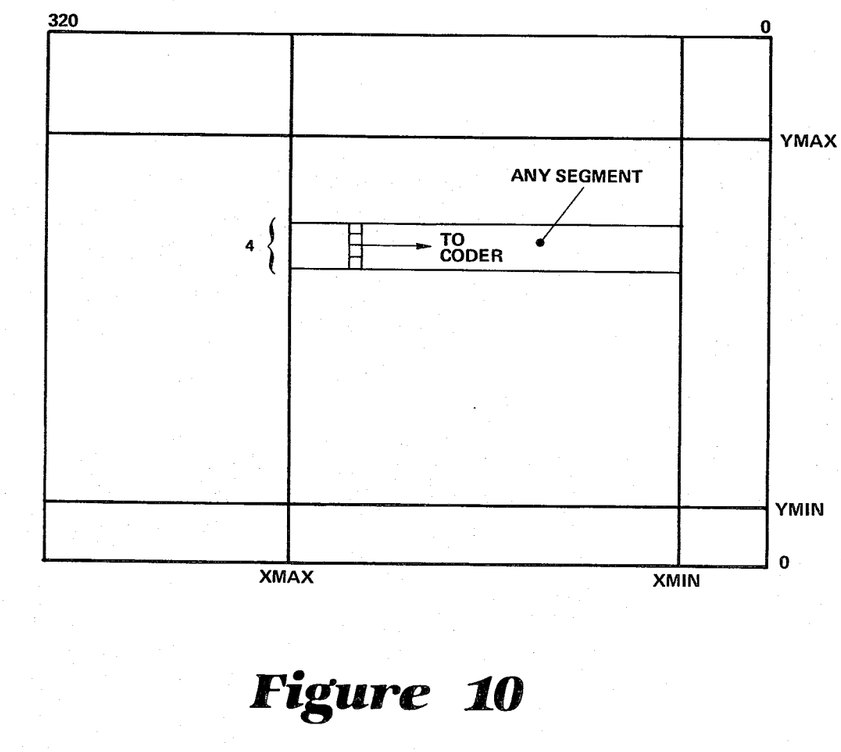
FIG. 10 illustrates a segment of the video and the area of the image buffer to be compressed.

The coder (24) accepts the video from the image buffer and performs a repetitive run length code on the video. Beginning at a corner reference point, the video is segmented into contiguous blocks of size a×b pels. "Runs" for run length coding are extracted by next selecting a direction of scan, horizontal or vertical, and then counting the number of consecutive blocks in that direction which contain identical pel patterns. A run is terminated either when the pel pattern of the a×b block changes or the edge of the document is encountered. The count of the number of consecutive identical blocks determines the length of the run. This portion of an image is referred to as a "segment." An illustration of a 1×4 pel segment scanning horizontally is shown in FIG. 10; also in this figure is shown the area of the image buffer to be compressed. The compression area is located between the horizontal limits of X min and X max and between the vertical limits of Y min and Y max. The limits are specified with reference to the bottom right corner of the image buffer with a resolution of 40 mils horizontally and 64 mils vertically.

The coded data is stored in the output buffer (25) for subsequent transfer to the image lift subsystem controller via the video bus. The output buffer does not store an entire image of coded data. Therefore, transfer to the ICDC occurs concurrently with coding.

The VFU controller (23) tracks images through the VFU monitoring for errors and exception conditions. It builds a table for each image to assist in tracking, sorting and decompressing the images. Also, it inputs format parameters and performs diagnostics.

Figure 11:
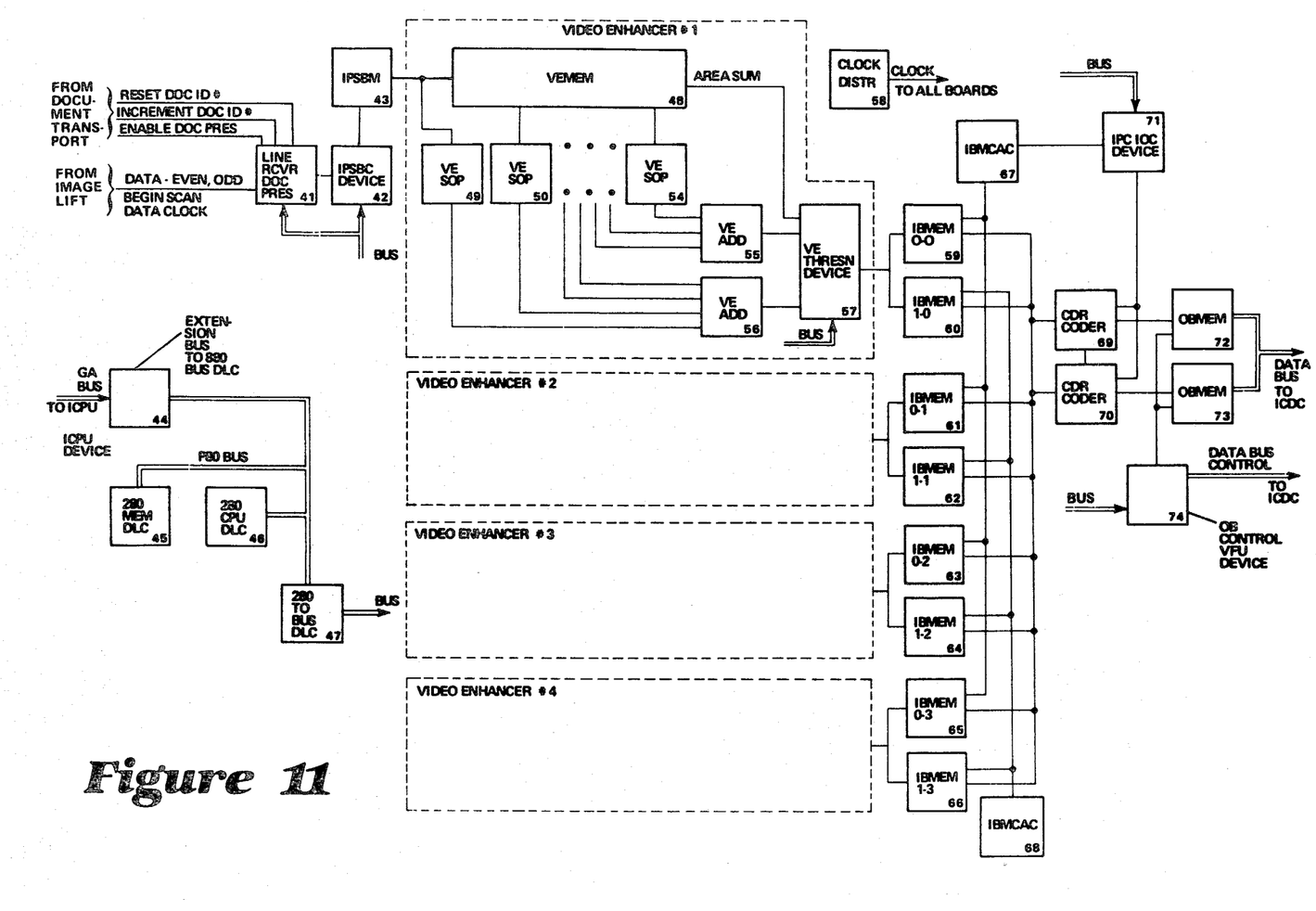
FIG. 11 is a detailed block diagram of the video format unit of the present invention.

FIG. 11 is a detailed block diagram of the VFU. The following relates these blocks to the basic blocks of FIG. 9.

| Basic Function | Blocks |
| --- | --- |
| Scan Buffer 20 | 41,42,43 |
| Video Enhancer 21 | 48–57 |
| Image Buffer 22 | 59–68 |
| Coder 24 | 69–71 |
| Output Buffer 25 | 72–74 |
| VFU Controller 23 | 44–47,75 |

The line receiver, document presence board (41), senses document presence from the video, maintains the document ID number, measures the document height, and measures the document width.

Document presence is sensed using the even channel video only. It is calculated by averaging and thresholding the white level over five scans of video armed by the enable document presence window signal from the transport electronics.

A five bit count is maintained by the line receiver/document presence board to be used as the document ID number. This count may be reset and incremented by the transport electronics. The count is compared to the document ID in the queued lift control blocks provided by the ICPU.

If a mismatch occurs the VFU Controller reports the error to the ICPU and inhibits the processing of the image.

The document height is measured by the line receiver/document presence board. This measurement is made by searching for consecutive cells above and below the image that are darker than a predetermined threshold. Only the even video is used for this measurement; no great degree of accuracy will be maintained.

The document width is measured by counting the number of scans that document presence is true. The document height and width are read by the VFU Controller at the trailing edge of document presence.

The scan buffer controller (IPSBC) (42) is used with the scan buffer memory (IPSBM) (43) to reformat the video from odd/even format from the video electronics to the multiple segment format required in the video electronics. Due to the speed requirements (2000 document/minute), multiple, separate overlapping video enhancers are required. Each enhancer uses a N×M matrix and therefore must have (N/2) cells of overlap at its vertical boundaries. The scan buffer divides the image into equal vertical segments. Each segment includes (N/2) cells of overlap on both its top and bottom boundaries.

The video enhancer is composed of one video memory board (48), N sum of product boards (49–55) (seven shown in this particular implementation), two adder boards (55) and (56), and a threshold board (57). The memory board contains enough memory to enable the enhancer to access M columns of video. It also contains an accumulator to create an area sum for the N×M array.

The sum of product boards (VESOP) each take one tap from the memory board and create one column of the N×M array. A read only memory is used to create a product consisting of the multiplication of the cell weight and the gray video value for with each position in the column. Then the N products are summed to create the sum of products for the columns. The sum of products are then added from each of the VESOP boards. The final sum is created on the theshold board. This number represents the filtered video. It is then thresholded either by a fixed value or by a function of the area sum.

The thresholded video is then processed by a 3×3 spot filter to create black/white video. Multiple different filter responses are provided by the spot filter. The filter used is selected by the choice of one of the appropriate format parameters.

A minimum of two complete image buffers are provided to allow simultaneous scanning (coding) and loading. Four image buffer memory boards (IBMEM) and one image buffer memory controller (IBMCAC) are required per buffer in the implementation shown. The buffers alternate loading images.

In the implementation shown the image buffer memory boards (59-66) load the black/white video from the video enhancers serially from the top of the image down. The memory is scanned horizontally or vertically incorporating sufficient pels to represent two segments in parallel (See FIG. 10). Multiple subimages residing within the boundaries of the original image may be extracted independently during the scanning process, and passed to the data encoder module. The encoded and compressed data may be formatted as a single image data block with multiple subimages contained therein, or as multiple image blocks each containing a single subimage.

The image buffer memory controller (67) and (68) begins the loading of the image after a document presence occurs and continues until either document presence terminates or the buffer becomes full. After the image is stored in the buffer the buffer controller verifies that limits have been stored for the image and that the VFU controller has cleared the image for compression. The buffer is then scanned horizontally or vertically beginning at X max and Y max and continuing until X min and Y min is reached.

A minimum of two coder boards (69) and (70) are required per Video Format Unit. Each board accepts k bits of the 2k bits from the image buffer. Each change of the k bit pattern is used as the basis of a repetitive run length code. The run code represents the number of repetitions of the base pattern code.

The pattern code precedes the run code and may be either directly coded or Huffman coded. If it is directly coded, the first bit is the topmost bit of the k bits received from the image buffer. The remaining k-1 bits follow in sequence. If the pattern is Huffman coded, a table, implemented in ROM, is used to map the pattern to a corresponding Huffman code.

The run code consists of a repetition code, terminated by a zero, and a bias code. The repetition code sets a base value for the run length and determines the length of the bias code. The number of repetitions is determined by adding the value of the repetition code to the value of the run bias.

As previously stated, the repetitive run length code consists of a pattern code followed by a run code. In addition to the run length code, the coders provide control codes indicating Begin Image, Begin Segment, and End Image.

The pattern code for directly coded patterns is as previously defined. If Huffman coding is used, the patterns with the higher frequencies of occurrence are assigned the shorter code words. The effectiveness of the Huffman coding is dependent on the frequencies of occurrence of the pattern codes. In the case of uniformly distributed pattern codes, the Huffman code represents a net gain in the coded image size.

The output buffer memories (OBMEM) (72) and (73) store two coded segments of data each and the output buffer controller (74) controls the transfer of the coded data onto the video bus. The output buffer controller also controls the transfer of the table from the VFU Controller to the video bus via the internal bus.

In operation, the two OBMEM memory buffers accept 2k bits of coded data from the coders until an end of segment signal is sensed from the coders. The output buffers are then switched allowing the second buffers to be loaded and the first buffers packed into sixteen bit words and shipped to the ICDC. The data is therefore shipped out beginning with the top most segment in the format shown in FIG. 5.

The foregoing video format unit has been described in specific block format. Various modifications and circuit arrangements may be used without departing from the novel concepts of this invention.

What is claimed is:

1. An image system video format unit wherein video data representative of a document image or portions thereof is received in a gray data format, enhanced and compressed prior to storage, comprising: means for receiving the video data and enhancing the black/white characterization thereof including a plurality of overlapping image enhancers which independently process overlapped areas of the document video to produce a single continuous video image, means for storing a complete image, means for scanning the image and coding, the scans thereof to compress the amount of data representative of the image, means for storing portions of the compressed video data as it is generated, and means for tracking the video data through the above means to monitor it for errors.

2. The image system video format unit according to claim 1 wherein said video data is in the form of p bit video gray data.

3. The image system video format unit according to claim 1 wherein said means for enhancing performs a two dimensional digital filter with programmable weights on the video data with a N cell by M cell (N×M) matrix.

4. The image system video format unit according to claim 3 wherein the video resulting from the N×N matrix is thresholded by a dynamic threshold in the N×M matrix.

5. The image system video format unit according to claim 1 wherein said video data is in the form of p bit video data.

6. The image system video format unit according to claim 5 wherein said means for enhancing performs a correlation process on the video data with a seven cell by seven cell (7×7) matrix.

7. The image system video format unit according to claim 6 wherein the video resulting from the 7×7 matrix is thresholded by a dynamic threshold in the 7×7 matrix.

8. The image system video format unit according to claim 4 wherein the thresholded video is processed through a 3 cell by 3 cell matrix to make a black/while decision for each cell of the matrix.

9. The image system video format unit according to claim 1 wherein said means for storing a complete image is a buffer memory which may be raster scanned in a horizontal or vertical direction for compression.

10. The image system video format unit according to claim 1 wherein the black/white video data is compressed by a k-element wide block run length encoder.

11. The image system video format unit according to claim 10 wherein the black/white video is compressed by a 4 element wide block run length coder.

12. The image system video format unit according to claim 1 wherein said means for coding accepts the video data and performs a repetitive run length code thereon.

13. The image system video format unit according to claim 10 wherein the k-element wide run length block pattern is encoded by one encoding means, and the run length of the block pattern is encoded by a second encoding means.

14. The image system video format unit according to claim 4 including two means for storing a complete image to permit faster processing of video images.

15. An image system video format unit wherein gray video data representative of a document image or portions thereof is enhanced and compressed prior to storage, comprising: means for receiving and enhancing the black/white characteristics of the image including a plurality of overlapping image enhancers which independently process overlapped areas of the document video to produce a single continuous video image, means for storing two or more different enhanced images or portions thereof, means for simultaneously scanning each image, and means for compressing each image.

16. The image system video format unit according to claim 15 wherein video images are alternately loaded into said means for storing two or more different images.

17. The image system video format unit according to claim 15 wherein said each means for storing images is loaded serially.

* * * * *

UNITED STATES PATENT AND TRADEMARK OFFICE
CERTIFICATE OF CORRECTION

PATENT NO. : 4,467,354

DATED : August 21, 1984

INVENTOR(S) : John C. Eby, Jr., David L. Cauthron, Michael M. Ludeman and James R. Hicks It is certified that error appears in the above-identified patent and that said Letters Patent is hereby corrected as shown below:

Column 1, line 19, change "practice" to --practical--.

Column 4, line 23, change "receiver/-" to --receiver/--.
Column 4, line 57, change "(55) and (56)" to --(56) and (57)--; change "(57)" to --(58)--.
Column 6, line 47, change "N X N" to --N X M--.

Column 6, line 63, change "black/while" to --black/white--.

Signed and Sealed this

Thirtieth Day of July 1985

[SEAL]

Attest:

DONALD J. QUIGG

Attesting Officer — Acting Commissioner of Patents and Trademarks